United States Patent
Kobayashi et al.

(10) Patent No.: US 6,374,243 B1
(45) Date of Patent: Apr. 16, 2002

(54) DATABASE ACCESS SYSTEM HAVING TIME-OUT MECHANISM

(75) Inventors: Kazue Kobayashi; Toru Nagaoka; Masashi Sakata, all of Tokyo (JP)

(73) Assignee: NTT Communicationware Corporation, Tokyo (JP)

( * ) Notice: Subject to any disclaimer, the term of this patent is extended or adjusted under 35 U.S.C. 154(b) by 0 days.

(21) Appl. No.: 09/275,013

(22) Filed: Mar. 24, 1999

(30) Foreign Application Priority Data

May 27, 1998 (JP) .......................................... 10-146371

(51) Int. Cl.$^7$ .............................................. G06F 17/30
(52) U.S. Cl. ............................. 707/8; 707/10; 707/201; 714/1
(58) Field of Search ............................. 707/1, 10, 200, 707/201, 8, 202, 203, 204; 714/100, 1; 711/100, 167

(56) References Cited

U.S. PATENT DOCUMENTS

| | | | |
|---|---|---|---|
| 5,095,421 A | * 3/1992 | Freund | 709/101 |
| 5,363,121 A | * 11/1994 | Freund | 709/101 |
| 5,586,312 A | * 12/1996 | Johnson et al. | |
| 5,781,910 A | * 7/1998 | Gostanian et al. | 707/201 |
| 5,884,327 A | * 3/1999 | Cotner et al. | 707/202 |
| 5,958,004 A | * 9/1999 | Helland et al. | 709/101 |
| 6,202,067 B1 | * 3/2001 | Blood et al. | 707/10 |

OTHER PUBLICATIONS

Muth et al., How to handle global transactions in heterogeneous database systems, IEEE, 1992, pp. 192–198.*
Yu et al., Transaction management for a distributed object storage system WAKASHI–design, implementation and performance, IEEE, 1996, pp. 460–468.*
Thomas et al., Heterogeneous distributed database systems for production use, ACM Computing Surveys, vol. 22, Issue 3, 1990, pp. 237–266.*

* cited by examiner

Primary Examiner—Hosain T. Alam
Assistant Examiner—Joon Hwan Hwang
(74) Attorney, Agent, or Firm—Burns Doane Swecker & Mathis LLP

(57) ABSTRACT

The present invention relates a database access system comprising: a plurality of database servers, each of which accommodates a database; and an application server which is connected to the above-mentioned plurality of database servers. The application server comprises a plurality of local transaction managers, each of which corresponds to each of the databases, and individually processes transactions for updating the corresponding database; and a distributed transaction manager which individually provides commands for database updating to the transaction managers.

6 Claims, 7 Drawing Sheets

DATABASE ACCESS SYSTEM HAVING TIME-OUT MECHANISM

BACKGROUND OF THE INVENTION

1. Field of the Invention

The present invention relates to a database access system for use in accessing a plurality of distributed databases from a plurality of client terminals; and a computer program product, which contains an application program for the same.

This application is based on patent application No. Hei 10-146371, filed in Japan, the content of which is incorporated herein by reference.

2. Description of the Related Art

FIG. 5 is a block diagram, showing a structure of a conventional database access system. The database access system in this diagram exhibits a three-layer structure, comprising a client layer, an intermediate layer, and a database layer.

In the client layer shown in FIG. 5, client terminals (computers) $30_1$–$30_3$ installed at the client site are respectively connected to a network 3. The network 3 can be, for example, an internet. Furthermore, each of the client application programs $31_{1-313}$ executed by the respective client terminal $30_{1-303}$ is recorded into the memory portion of each respective client terminal $30_1$–$30_3$.

These client application programs $31_1$–$31_3$ are programs for requesting a service with regard to an application server 34, described hereinafter, and for receiving the results of said service.

In addition, in the database layer, the database servers $32_1$–$32_3$ are computers which store the databases $33_1$–$33_3$, delivered via the network 3. Each respective database $33_1$–$33_3$ is recorded into the memory portion of the corresponding database server $32_1$–$32_3$. These databases $33_1$–$33_3$ are all identical in type.

Furthermore, in the intermediate layer, the application server 34 is a computer which accommodates the client terminals $30_1$–$30_3$ via the network 3, and is connected to the database servers $32_1$–$32_3$. The application server 34 processes service requests from each of the client terminals $30_1$–$30_3$. Additionally, the server application program 35, run by the application server 34, is stored into a memory portion of the application server 34.

The server application program 35 is a program for performing the above-mentioned services, an example of which includes accessing the databases $33_1$–$33_3$, described later. In other words, the application server 34 accesses the databases $33_1$–$33_3$, based on a service request from a client terminal $30_1$–$30_3$, and performs transactions such as updating and reading data, etc. Herein, data update is performed by means of a two-phase commit, comprising the two phases of temporary updating and permanent updating.

In the application server 34, the transaction processing (TP) monitor 36 performs distributed transaction processing, or more concretely, accesses the databases $33_1$–$33_3$. Hereinafter, distributed transaction processing represents the process of accessing the distributed databases $33_1$–$33_3$.

Herein, the distributed transaction standard employs a TX/XA interface using X/Open. FIG. 6 is a block diagram, showing a reference model of the above-mentioned distributed transaction processing; and FIG. 7 is a block diagram, showing a TX/XA interface using X/Open. In FIGS. 6 and 7, the corresponding parts to FIG. 5 have the same reference numbers.

In FIG. 6, the transaction manager 37 corresponds to the transaction processing monitor 36 shown in FIG. 5, and possesses an interface with the server application program 35.

The resource mangers $38_1$–$38_3$ are, individually, managed by the server application program 35 and the transaction manager 37, and correspond, respectively, to the databases $33_1$–$33_3$ shown in FIG. 5. Herein, the resource managers $38_1$–$38_3$ interface with both the transaction manager 37 and the server application program 35.

In addition, in FIG. 7, the resource manager $38_1$, (see FIG. 6) is a general term for the database $33_1$, (see FIG. 5) and the communication resource manager $39_1$. The communication resource manager $39_1$ controls communication between other systems (not shown) and the database server $32_1$, via the network 44. Herein, FIG. 7 shows only a structure of the resource manager $38_1$, shown in FIG. 6; however, structures of the resource managers $38_2$ and $38_3$, shown in FIG. 6, are identical to the structure of the resource manager $38_1$, shown in FIG. 7.

The TX interface 40 is an interface between the server application program 35 and the transaction manager 37. The XA interface 41 is an interface between the transaction manager 37 and the database $33_1$. The XA+interface 42 is an interface between the transaction manager 37 and the communication resource manager $39_1$. The application/resource manager interface 43 is an interface between the server application program 35 and the database $33_1$.

As described above, a conventional database access system possesses four interfaces: the TX interface 40; the XA interface 41; the XA+interface 42; and the application/resource manager interface 43. Further, the database $33_1$, is accessed by each of the server application program 35 and the transaction manager 37, via another interfaces such as the XA interface 41 and the application/resource interface 43, respectively.

In the following, the operation of the above-mentioned conventional database access system is described.

In the descriptions below, an example case in which a client terminal $30_1$, shown in FIG. 5, requests the application server 34 for a service, such that the application server 34 updates the databases $33_1$, and $33_2$, in order to respond to the service request.

In FIG. 5, when service request data is inputted from the client terminal $30_1$, to the application server 34 via the network 3, the application server 34 performs the following processing by means of running the server application program 35.

That is, the application server 34 accesses the database servers $32_1$, and $32_2$, in order to temporarily update the databases $33_1$, and $33_2$. Concretely, the server application program 35 (i.e., the application server 34) provides the command for temporarily updating the database to the transaction manager 37 via the TX interface 40. As a result, the transaction manager 37 temporary updating of the above-mentioned data, by means of accessing the databases $33_1$, and $33_2$ via the XA interface 41.

Subsequently, after this temporary updating is completed, under normal circumstances, the server application program 35 (i.e., the application server 34) outputs the control data for performing permanent updating of the databases $33_1$, and $33_2$, to the transaction manager 37 via the TX interface 40. Accordingly, the transaction manager 37 performs permanent updating of the data, by means of accessing the databases $33_1$ and $33_2$ via the XA interface 41.

A conventional database access system is designed to access a plurality of the databases $33_1$–$33_3$ in parallel, by means of a single transaction manager 37 (i.e., transaction processing monitor 36). This causes in an extremely complex structure for both the transaction manager 37 (i.e., transaction processing monitor 36) and the TX interface 40.

Additionally, a conventional database access system is designed to have four interfaces: the TX interface 40; the XA interface 41; the XA+interface 42; and the application/resource manager interface 43, shown in FIG. 7, which results in a large number of interfaces.

In summary, a conventional database access system is disadvantageous from the viewpoint of its high costs secondary to the above-mentioned complex structure and large number of interfaces.

Moreover, a conventional database access system accesses a plurality of the databases $33_1$–$33_3$ by means of a single transaction manager 37 (i.e., the transaction processing monitor 36). Accordingly, it is absolutely necessary for the databases $33_1$–$33_3$ to be identical in type.

Thus, conventional database access systems are also disadvantageous in being unable to handle different types of databases.

SUMMARY OF THE INVENTION

In consideration of the above-mentioned, a object of the present invention is to provide an economical database access system possessing a simple structure, which can handle different types of databases.

According to the present invention, the above-mentioned object is achieved by means of a database access system comprising: a plurality of database servers, each of which accommodates a database; an application server which is connected to each of the database servers; wherein the application server comprises a plurality of local transaction managers, each of which corresponds to the databases, and processes transactions for updating these databases; and a distributed transaction manager which individually provides commands for database updating to each of the local transaction managers.

According to the present invention, a plurality of local transaction managers which correspond to a plurality of databases are installed in each application server, and these local transaction managers process, individually, an accessing transaction (i.e., updating transaction). Accordingly, according to the present invention, when compared to a conventional database access system, it is possible to simplify processing control, which in turn simplifies the overall system structure, thereby lowering costs.

DESCRIPTION OF THE PREFERRED EMBODIMENTS

The following embodiments do not limit the invention with regard to the claims. In addition, all the combinations of the characteristics described in the embodiments are not necessarily essential to achieve the object of the present invention.

Figure 1:
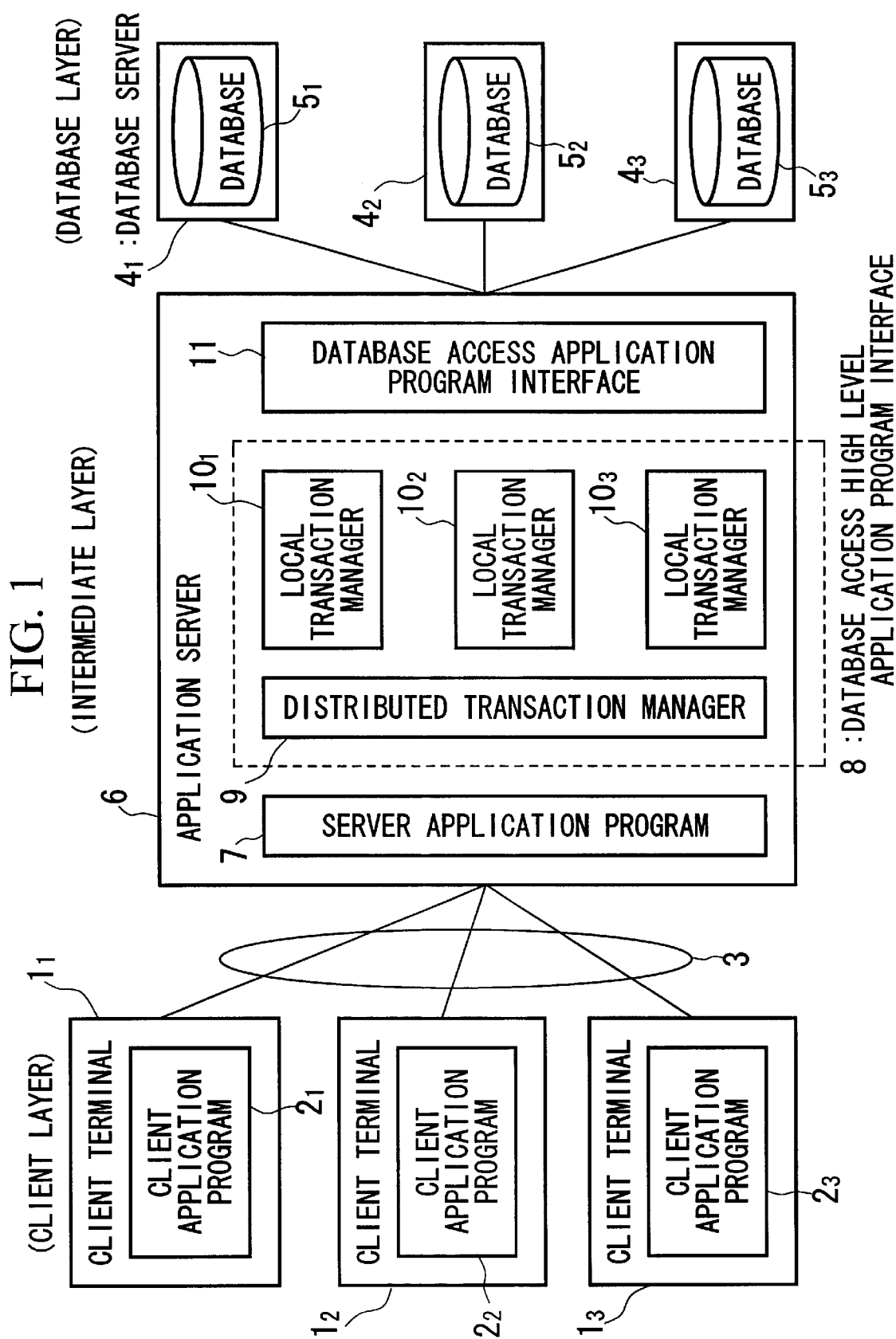
FIG. 1 is a block diagram, showing a structure of the database access system according to an embodiment of the present invention.

In the following, embodiments of the present invention are described with reference to the figures. FIG. 1 is a block diagram, showing a structure of the database access system according to an embodiment of the present invention. In FIG. 1, a database access system is shown which possesses a three-layer structure comprising a client layer, an intermediate layer, and a database layer.

In the client layer shown in FIG. 1, the client (computer) terminals $1_1$–$1_3$ are, respectively, installed at the clients' sites, and connected to a network 3. The network 3 can be, for example, an internet. Each of the client application programs $2_1$–$2_3$ run by the respective client terminal $1_1$–$1_3$ is recorded into the memory portion of each respective client terminal $1_1$–$1_3$.

These client application programs $2_1$–$2_3$ are programs designed to request the application server 6, described hereinafter, for a service, and to receive the result of this service.

In addition, in the database layer, the database servers $4_1$–$4_3$ are computers which house the databases $5_1$–$5_3$, delivered via the network 3; and each of the databases $5_1$–$5_3$ is recorded into the memory portion of the corresponding database servers $4_1$–$4_3$. These databases $5_1$–$5_3$ can be identical or different in type.

Furthermore, in the intermediate layer, the application server 6 is a computer which accommodates the client terminals $1_1$–$1_3$ via the network 3, and is connected to the database servers $4_1$–$4_3$. A timer (see timer 14 in FIG. 4) is installed in the application server 6.

The application server 6 processes service requests from each of the client terminals $1_1$–$1_3$. Additionally, the server application program 7, run by the application server 6, is recorded into a memory portion of the application server 6.

The server application program 7 is a program for performing the above-mentioned services, an example of which includes accessing the databases $5_1$–$5_3$, described later. That is, the application server 6 accesses the databases $5_1$–$5_3$, based on a service request from the client terminals $1_1$–$1_3$, and performs transactions such as updating and reading data, etc. Herein, data is updated by means of a two-phase commit, comprising the two phases of temporary updating and permanent updating.

In the application server 6, the database access high level application program interface (API) 8 is an interface to access the databases $5_1$–$5_3$, comprising the distributed transaction manager 9 and the local transaction managers $10_1$–$10_3$.

The distributed transaction manager 9 centrally controls the above-mentioned distributed transaction processing, and controls the local transaction managers $10_1$–$10_3$ in an integrated manner. The local transaction managers $10_1$–$10_3$ correspond to the databases $5_1$–$5_3$, and individually perform transaction processing (i.e., the transaction for accessing a database) under the control of the distributed transaction manager 9. Concretely, the local transaction managers 10₁ and 10₃ perform data updating and the like, by means of individually accessing the databases 5₁–5₃.

The database access application program interface (API) 11 is an interface between the local transaction managers 10₁–10₃ and the databases 5₁–5₃; an example of the above-mentioned includes JDBC (Java Data Base Connectivity) which is an interface for accessing a database by means of Java.

Figure 2:
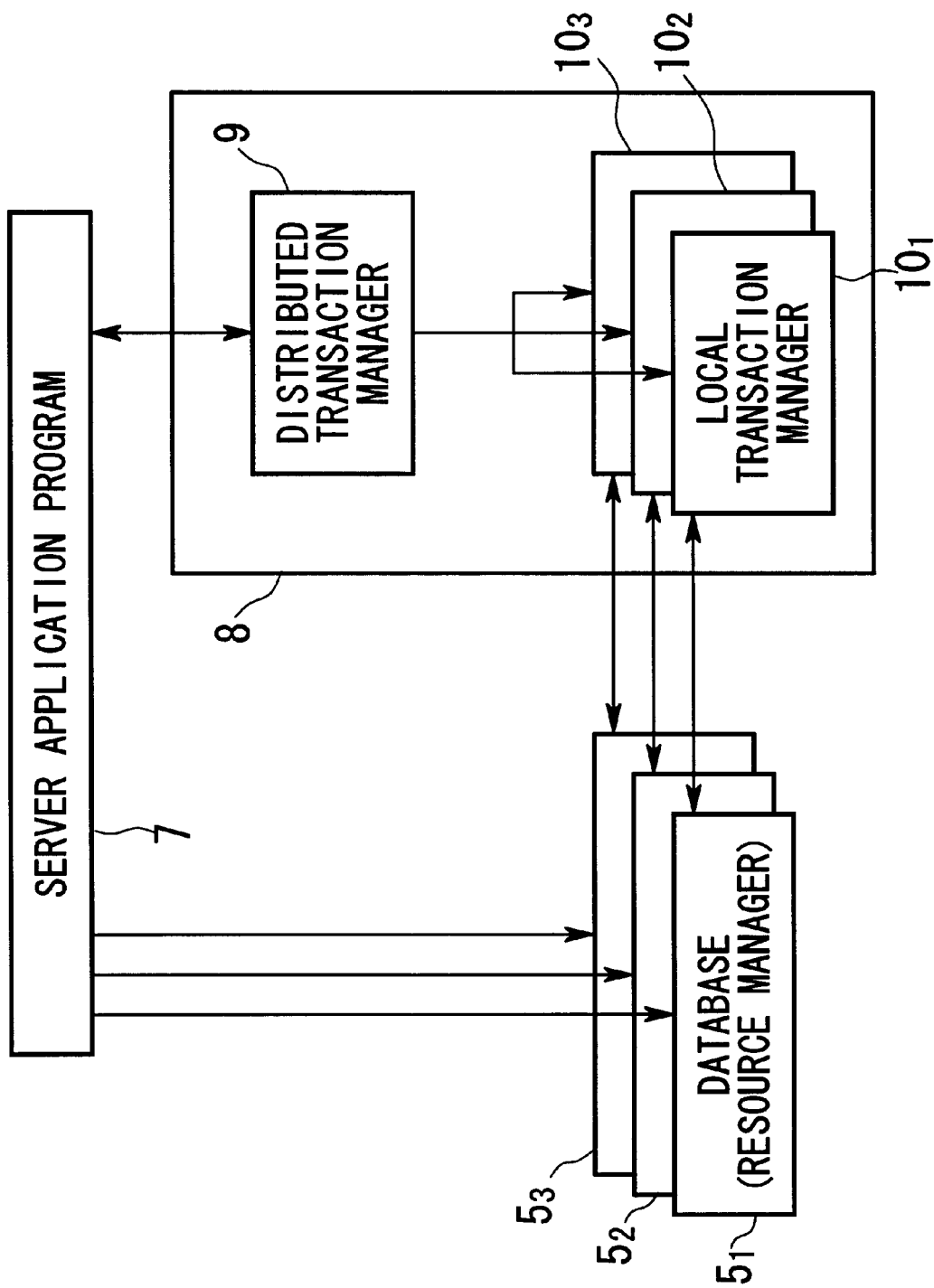
FIG. 2 is a block diagram, showing a reference model of distributed transaction processing in the database access system according to an embodiment of the present invention.
Figure 3:
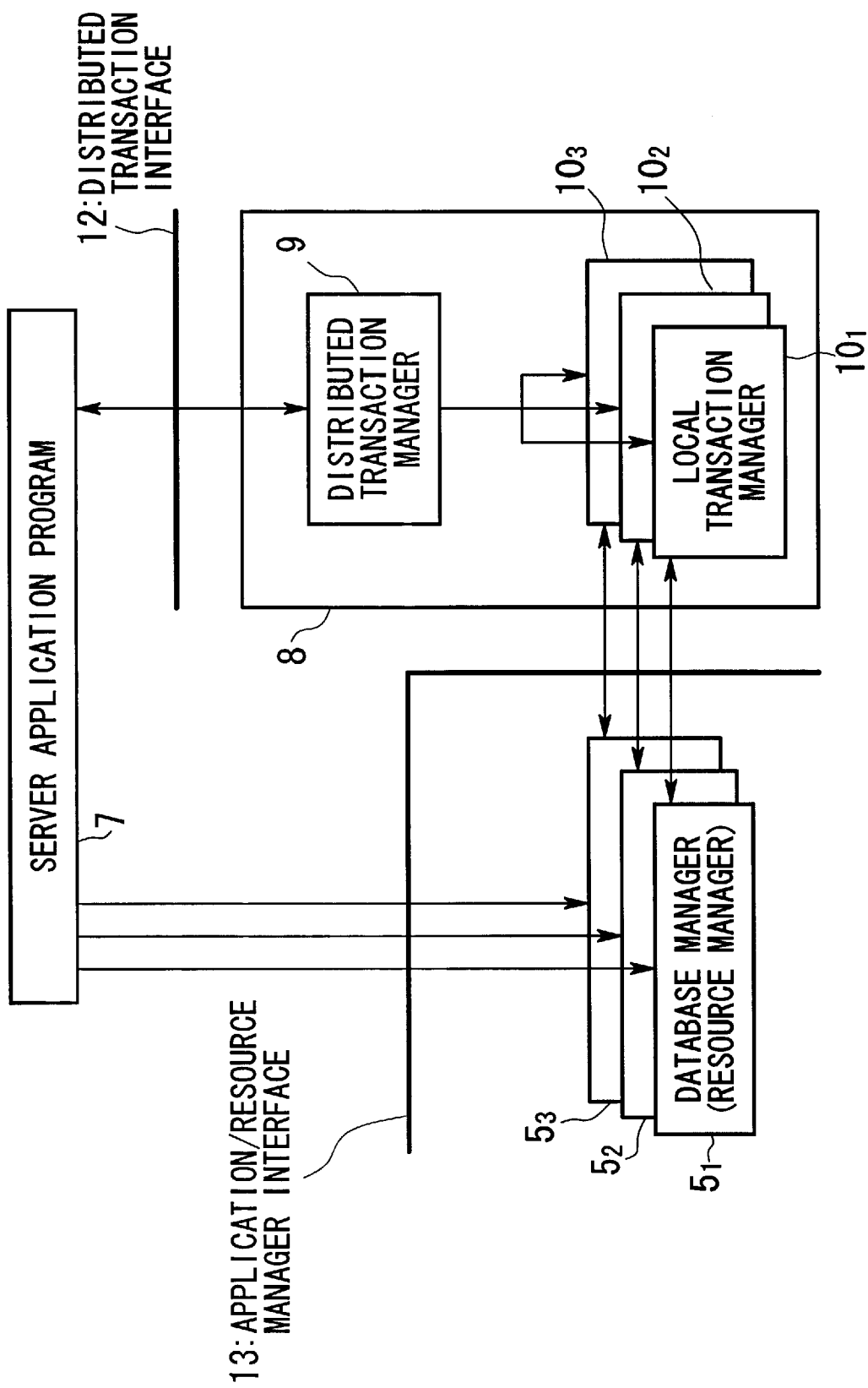
FIG. 3 is a block diagram, showing interfaces of the database access system according to an embodiment of the present invention.

FIG. 2 is a block diagram, showing a reference model of distributed transaction processing in the database access system according to an embodiment of the present invention. FIG. 3 is a block diagram, showing interfaces in the database access system according to an embodiment of the present invention. In the FIGS. 2 and 3, items corresponding to those shown in FIG. 1 are labeled with the same reference number.

In FIG. 2, the server application program 7 possesses an interface with the distributed transaction manager 9. Further, the server application program 7 possesses interfaces with the databases 5₁–5₃ (referred to as primary interfaces); and the local transaction managers 10₁–10₃ possess interfaces with databases 5₁–5₃ (referred to as secondary interfaces). In actuality, the above-mentioned primary interfaces and the secondary interfaces comprise a single interface(referred to as the application/resource manager interface 13 in FIG. 3). Herein, the databases 5₁–5₃ are one type of the above-mentioned resource manager.

These interfaces are described with reference to FIG. 3.

In FIG. 3, the distributed transaction interface 12 is an interface between the server application program 7 and the distributed transaction manager 9. That is, the server application program 7 (i.e., the application server 6) provides a command for transaction processing (i.e., processing of updating database) to the distributed transaction manager 9 via the distributed transaction interface 12. The distributed transaction interface 12 corresponds to the database access high level application program interface 8, shown in FIG. 1.

The application/resource manager interface 13 corresponds to the database access application program interface 11, shown in FIG. 1, and possesses interfaces between the server application program 7 and the databases 5₁–5₃, and other interfaces between the local transaction managers 10₁–10₃ and the corresponding databases 5₁–5₃.

In other words, the server application program 7 (i.e., the application server 6) can access the databases 5₁–5₃ via the application/resource manager interface 13; on the hand, the local transaction managers 10₁–10₃ can access the databases 5₁–5₃ via the application/resource manager interface 13.

Additionally, an example of the application/resource manager interface 13 includes the above-mentioned JDBC.

Figure 4:
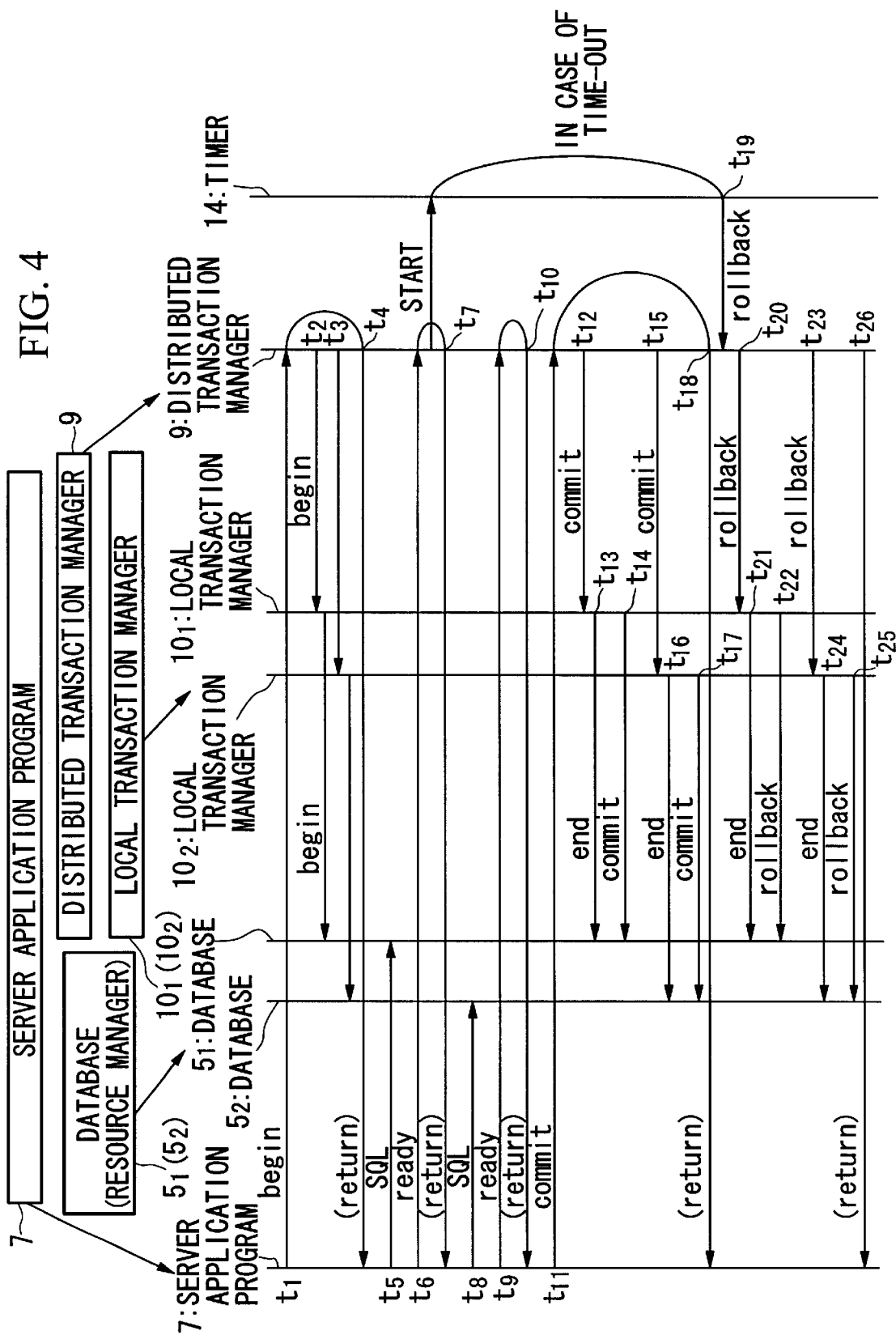
FIG. 4 is a diagram showing the sequence of the database access system according to an embodiment of the present invention.
Figure 5:
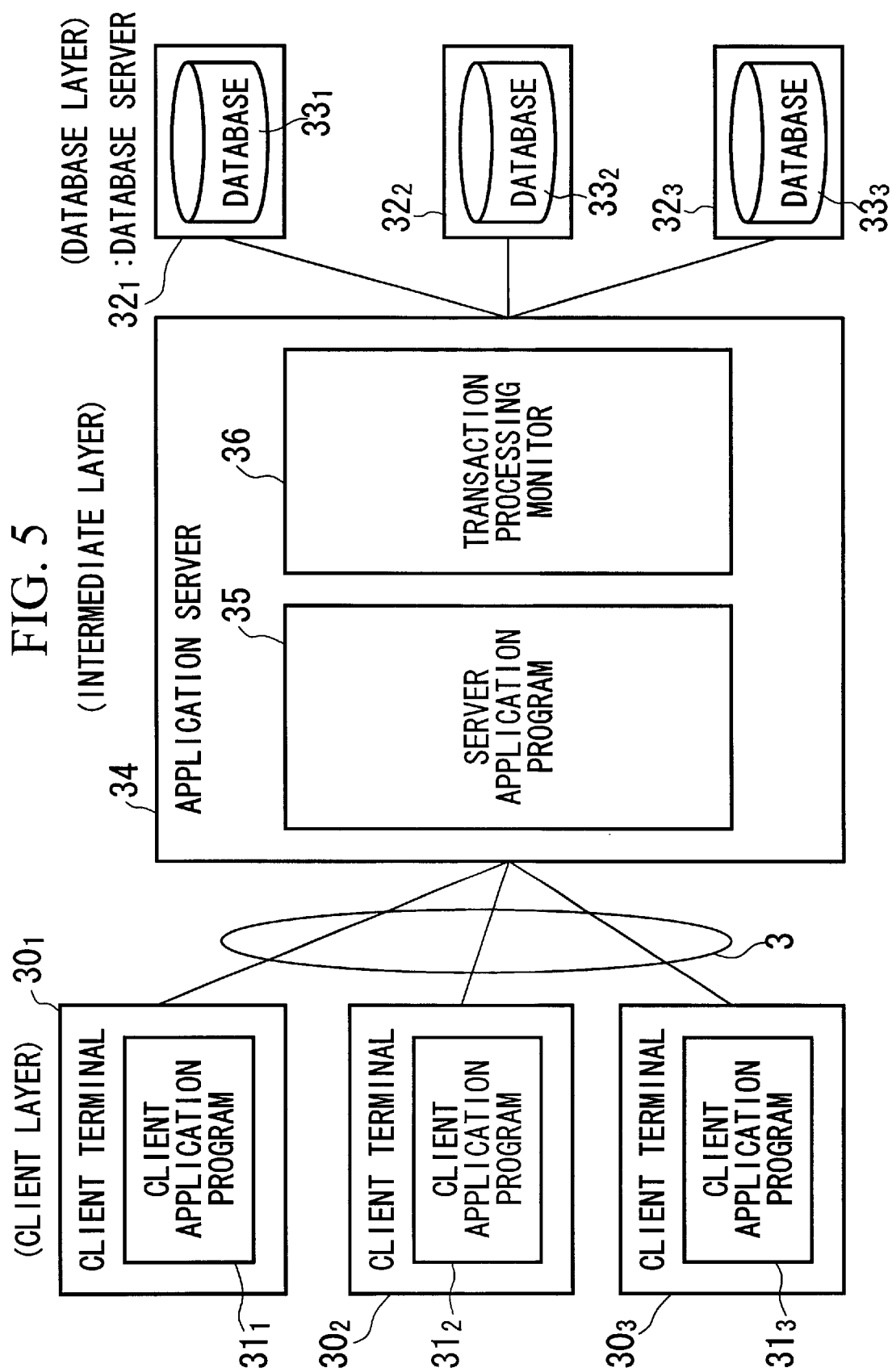
FIG. 5 is a block diagram, showing a structure of a conventional database access system.
Figure 6:
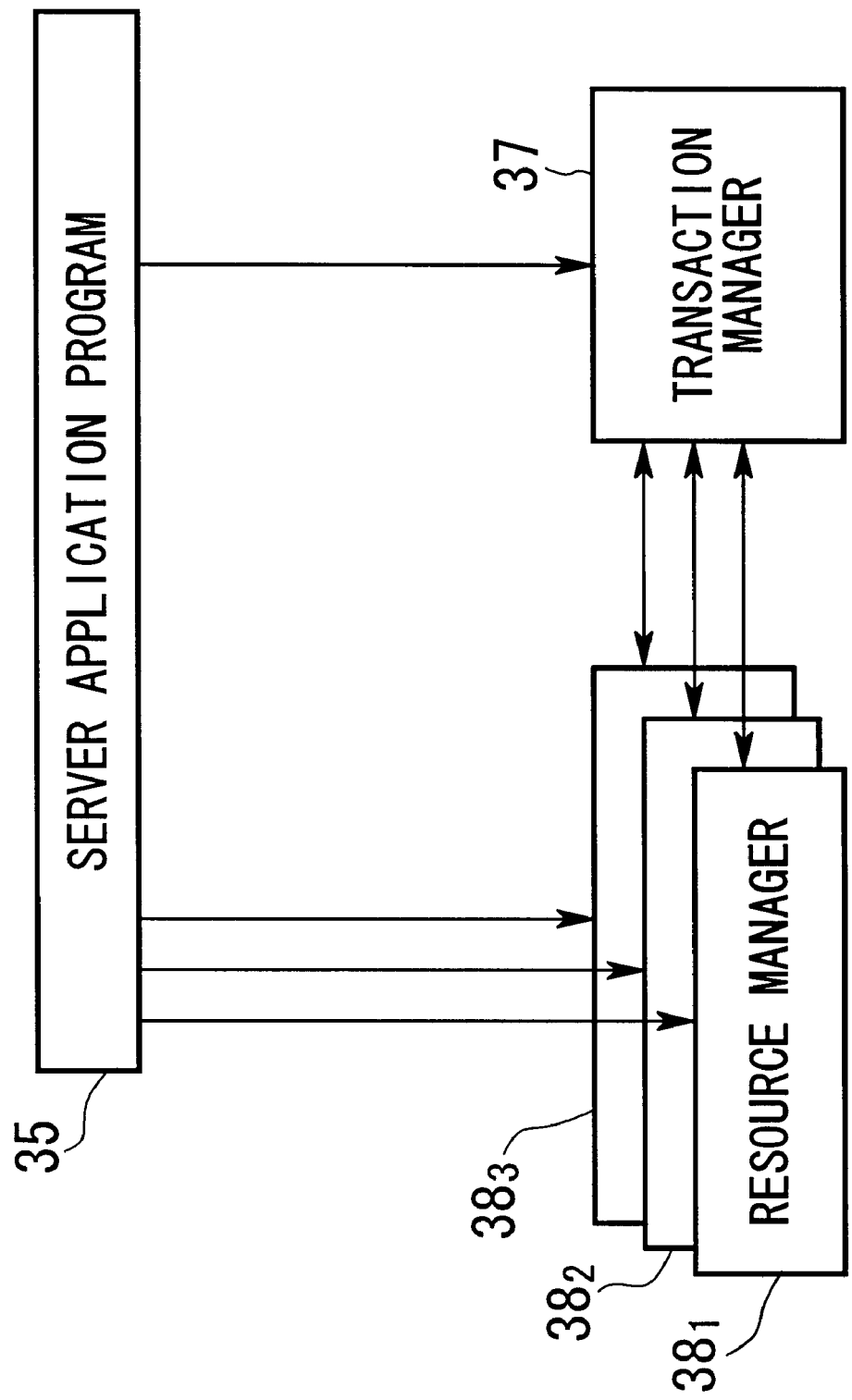
FIG. 6 is a block diagram, showing a reference model of distributed transaction processing in a conventional database access system.
Figure 7:
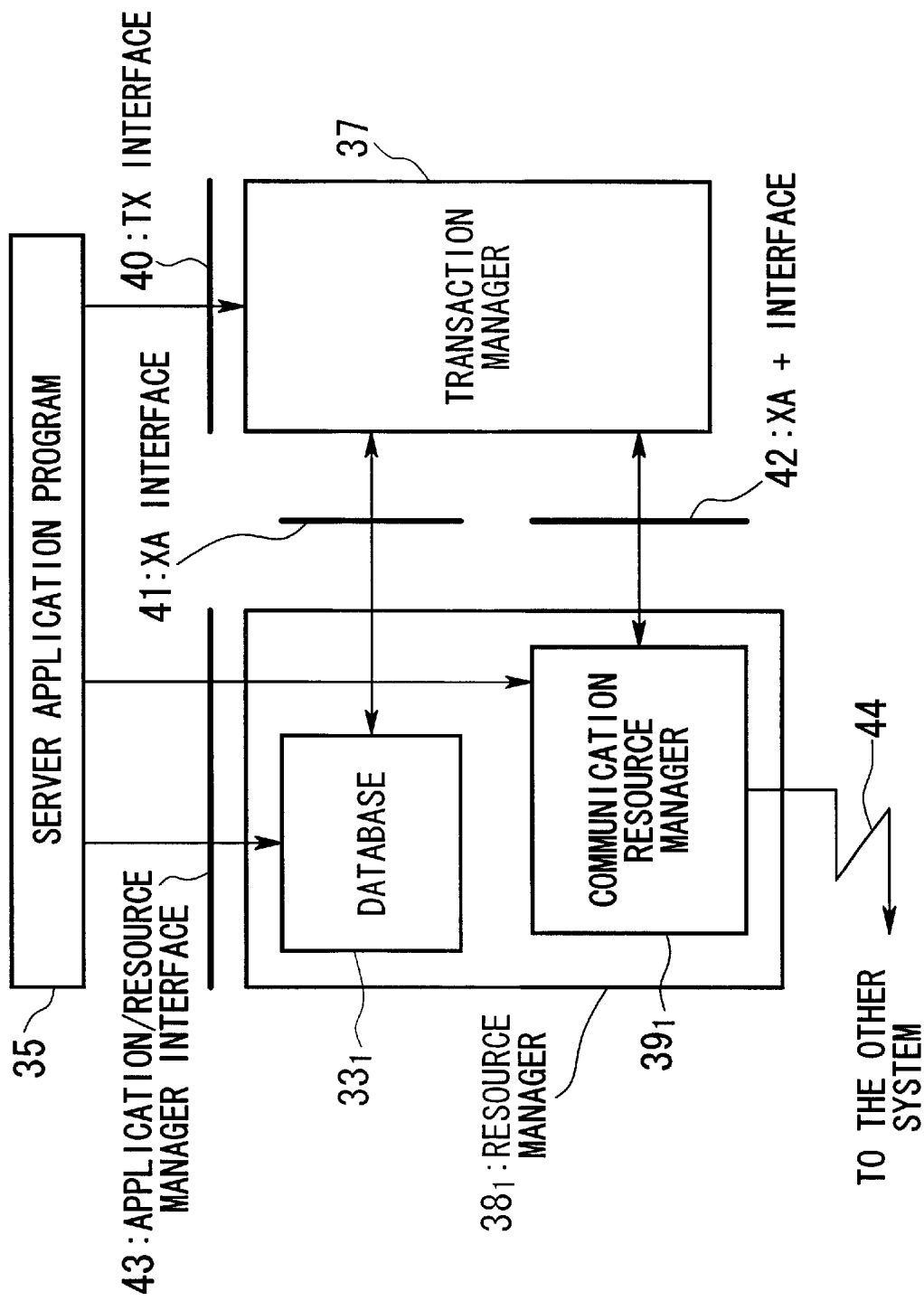
FIG. 7 is a block diagram, showing a TX/XA interface using X/Open in a conventional database access system.

In the following, the operations of the above-mentioned database access system according to an embodiment of the present invention are described with reference to a sequence diagram, shown in FIG. 4

In the descriptions below, an example case is given, in which the client terminal 1₁, shown in FIG. 1, requests the application server 6 for a service, with the application server 6 updating the databases 5₁ and 5₂ in response to the service request. Data is updated by means of a two-phase commit, comprising the two phases of temporary updating and permanent updating, as described previously.

In FIG. 1, when a service request data is inputted from the client terminal 1₁ to the application server 6 via the network 3 at time t-0, the application server 6 performs the following processing by means of running the server application program 7. In the following, processing performed by the application server 6 is regarded as processing by the application program 7.

At time t-1(which is>t-0) the server application program 7 provides a command for starting transaction to the distributed transaction manager 9 via the distributed transaction interface 12 (hereinafter, referred to as "begin command"). In this manner, the distributed transaction manager 9 provides a begin command to the local transaction manager 10₁ at time t-2. As a result, the local transaction manager 10₁ provides a begin command to the database 5₁ (i.e., the database server 4₁) via the application/resource manager interface 13.

Subsequently, at time t-3, the distributed transaction manager 9 provides a begin command to the other local transaction manager 10₂. As a result, the local transaction manager 10₂ provides a begin command to the database 5₂ (i.e., the database server 4₂) via the application/resource manager interface 13.

In the same manner, the distributed transaction manager 9 provides a similar begin command for starting a transaction to the local transaction manager 10₃.

When all the databases 5₁–5₃ start transaction at time t-4, the distributed transaction manager 9 outputs a signal to indicate that all of the above-mentioned transactions have begun(referred to as a return signal) to the server application program 7 via the distributed transaction interface 12.

At the time t-5, the server application program 7 provides a command for temporary updating, using SQL (Structured Query Language) to the database 5₁ via the application/resource manager interface 13. Accordingly, the database 5₁ is temporarily updated.

Furthermore, at time t-6, the server application program 7 outputs a signal to indicate that the database 5₁ is ready for permanent updating(hereinafter, referred to as a ready signal) to the distributed transaction manager 9 via the distributed transaction interface 12. As a result, the distributed transaction manager 9 recognizes that the database 5₁ is ready for permanent updating(i.e., in a state of temporary updating) and subsequently outputs a signal to indicate the recognition (hereinafter, referred to as a return signal) to the server application 7 via the distributed transaction interface 12, at time t-7. When the first return signal described above is inputted, the server application 7 starts the timer 14.

At this point, in order to update two databases 5₁ and 5₂ among the databases 5₁–5₃, at time t-8, the server application program 7 provides a command for temporary updating, using SQL, to the database 5₂ via the application/resource manager interface 13. Accordingly, the database 5₂ is temporarily updated.

Subsequently, at time t-9, the server application program 7 outputs a ready signal to indicate that the database 52 is ready for permanent updating, to the transaction manager 9 via the distributed transaction interface 12. Herein, with regard to the updating operation, when the number of ready signals inputted to the distributed transaction manager 9 corresponds to the number of the databases, the database is ready for permanent updating. Accordingly, at time t-9, the database is ready for permanent updating since a ready signal has been inputted to the distributed transaction 9 twice.

Further, the transaction manager 9 recognizes that the database 5₂ is ready for the permanent updating, and subsequently outputs a signal to indicate the recognition (hereinafter, referred to as a "return signal") to the server application 7 via the distributed transaction interface 12.

In a case of updating the database $5_3$, the above-mentioned operation is performed, and a ready signal is inputted to the distributed transaction manager 9 a total of three times.

At time t-11, the server application program 7 provides a command for updating the databases $5_1$ and $5_2$ permanently (hereinafter, referred to as a "commit command")(or a command for returning the databases $5_1$ and $5_2$ to a state before temporary updating (hereinafter, referred to as a "rollback command")) to the distributed transaction manager 9 via the distributed transaction interface 12. Subsequently, at time t-12, the transaction manager 9 provides a commit command to the first local transaction manager $10_1$.

As a result, the local transaction manager $10_1$ outputs a signal to indicate that the transaction processing is completed (hereinafter, referred to as an "end signal") to the database $5_1$ via the application/resource manager interface 13. Subsequently, at time t-14, the local transaction manager $10_1$ provides a commit command to the database $5_1$ via the application/resource manager interface 13. Accordingly, the database $5_1$ is permanently updated. Subsequently, at time t-15, the distributed transaction manager 9 provides a commit command to the next local transaction manager $10_2$. As a result, the local transaction manager $10_2$ outputs an end signal to the database $5_2$ via the application/resource manager interface 13 at time t-16. Then, at time t-17, the local transaction manager $10_2$ provides a commit command to the database $5_2$ via the application/resource manager interface 13. Accordingly, the database $5_2$ is permanently updated, and temporary updating and permanent updating of all the databases to be updated, the databases $5_1$ and $5_2$, are completed.

Subsequently, after permanent updating is completed, the distributed transaction manager 9 outputs a return signal to the server application 7 via the distributed transaction interface 12 at time t-18. Accordingly, the server application 7 recognizes that the processing for updating the databases $5_1$ and $5_2$ is completed.

In addition, the timer 14 observes the time period between the start of the operation, and an input of a return signal with respect to the last local transaction manager $10_2$ (referred to time t-10) i.e., the time period between starting and a state when all the databases to be updated are temporarily updated. When the above-mentioned time period exceeds the predetermined time period, the timer 14 judges the situation as a time-out. Herein, examples for causing a time-out may include mechanical troubles of the database server $4_1$ and the like; and cases in which temporary updating of the databases $5_1$ and $5_2$ are not completed in a normal fashion, due to a defect in the network or the like.

Herein, for example, the timer 14 determines that a time-out is required at time t-19 since temporary updating of the database $5_1$ is not completed in a normal manner, due to the above-mentioned reason. Accordingly, at time t-19, the timer 14 provides a rollback command for returning the databases $5_1$ and $5_2$ to a state before temporary updating, to the distributed transaction manager 9 via the distributed transaction interface 12. As a result, at time t-20, the distributed transaction manager 9 provides the above-mentioned rollback command to the local transaction manager $10_1$. Thereafter, at time t-21, the local transaction manager $10_1$ outputs an end signal to the database $5_1$ via the application/resource manager interface 13. Subsequently, at time t-22, the local transaction manager $10_1$ provides a rollback command to the database $5_1$ via the application/resource manager interface 13. Accordingly, the database $5_1$ is returned to a state prior to temporary updating.

Subsequently, at time t-23, the distributed transaction manager 9 provides a rollback command to the next local transaction manager $10_2$, in the same manner as with the above-mentioned operation. Then, at time t-25, the local transaction manager $10_2$ provides a rollback command to the database $5_2$ via the application/resource manager interface 13. Accordingly, the database $5_2$ is similarly returned to a state preceding the temporary updating.

When all of the processing are completed, the distributed transaction manager 9 outputs a return signal to the server application program 7 via the distributed transaction interface 12, at time t-26.

As described above, according to the database access system described in the above-mentioned embodiment of the present invention, it is possible to simplify processing control, when compared to a conventional database access system, and thus also simplify the overall system structure, by means of having the local transaction managers $10_1$–$10_3$ correspond to the databases $5_1$–$5_3$, and individually accessing the databases $5_1$–$5_3$.

Additionally, according to the database access system described in the above-mentioned embodiment of the present invention, it is possible to reduce the number of interfaces, compared to a conventional database access system, and thus also reduce costs, by means of accessing the databases $5_1$–$5_3$ from the server application program 7 and the local transaction managers $10_1$–$10_3$, using a single application/resource manager interface 13, as shown in FIG. 2.

Furthermore, according to the database access system described in the above-mentioned embodiment of the present invention, it is possible to access databases even if the databases $5_1$–$5_2$ differ in type, by means of having the local transaction managers $10_1$–$10_3$ correspond to the databases $5_1$–$5_3$.

In the above-mentioned, a database access system according to an embodiment of the present invention is described in detail; however, its concrete structure is not limited to the above-mentioned embodiment, and the present invention may also include modifications in this design as long as these modifications do not deviate from the essential components of the present invention.

For example, in the database access system according to the above-mentioned embodiment, an example is given in which the present invention is applied to a distributed database environment comprising a client layer, an intermediate layer, and a database layer (FIG. 1). However, the present invention is not limited to such environment, and can be applied to any database environment.

Additionally, it is possible to provide the database access system according to the above-mentioned embodiment, by recording a computer readable program, which causes a computer system to execute the functions of the above-mentioned database access system, on a computer usable medium; and having the computer system road and run the program recorded on the computer usable medium. Herein, the computer system may also include hardware such as OS (Operating System), peripheral devices, and the like. In addition, the computer system may also include an environment offering homepages (or a display environment), if the system utilizes a World Wide Web system.

As described above, according to the present invention, when compared to a conventional database access system, it is possible to obtain the effects of simplifying processing control, and hence also simplify the overall system structure and reduce costs, by means of providing a plurality of local transaction managers which correspond to a plurality of databases, and having these local transaction managers process, individually, accessing (i.e., updating) of the databases.

In addition, according to the present invention, it is possible to obtain the effects of accessing different types of databases, by means of providing a plurality of local transaction managers which correspond to a plurality of databases.

What is claimed is:

1. A database access system comprising:

a plurality of database servers, each of which accommodates a database;

an application server which is connected to said plurality of database servers, wherein said application server processes transactions for data base updating by means of a two-phase commit, comprising temporary updating and permanent updating, said application server includes:

local transaction managers, each of which corresponds to each of the databases, and individually processes transactions for updating a corresponding database;

a distributed transaction manager which individually provides commands for database updating to the local transaction managers; and a timer started by said distributed transaction manager when said distributed transaction manager recognizes that a first database to be updated is in a state of temporary updating, said timer providing a command for returning each database to a state before temporary updating to said distributed transaction manager, when all of said databases to be updated are not temporarily updated before an occurrence of a time-out.

2. A database access system according to claim 1, wherein:

said database access system possesses client terminals connected to said application server via a network, which request for a service via said network; and said distributed transaction manager in said application server individually provides said command for database updating to the local transaction managers, in the case when any of the client terminals request for a service.

3. An application server comprising:

local transaction managers each corresponding to a database, said local transaction managers individually processes transactions for updating a corresponding database;

a distributed transaction manager which individually provides commands for database updating to the local transaction managers;

a timer started by said distribution transaction manager when said distributed transaction manager recognizes that a first database to be updated is in a state of temporary updating, said timer providing a command for returning each database to a state before temporary updating to said distributed transaction manager, in a case when all the databases to be updated are not temporarily updated before an occurrence of a time-out; and wherein said application server processes transactions for database updating by means of a two-phase commit, including temporary updating and permanent updating.

4. An application server, according to claim 3, wherein said distributed transaction manager individually provides the commands for database updating to the local transaction managers, in the case when said distributed transaction manager receives data for a service request from a client terminal via a network.

5. A computer program product containing a computer readable program recorded on a computer usable medium, said program effecting the functions of:

local transaction managers, each of which corresponds to a plurality of databases, and individually processes transactions for updating a corresponding database;

a distributed transaction manager which individually provides commands for database updating to the local transaction managers;

a timer started by said distribution transaction manager when said distributed transaction manager recognizes that a first database to be updated is in a state of temporary updating, said timer providing a signal for returning each database to a state before temporary updating to said distributed transaction manager, in a case when all the databases to be updated are not temporarily updated before an occurrence of a time-out according to said timer; and wherein said program causes said computer such that an application server processes transactions for database updating by means of a two-phase commit, including temporary updating and permanent updating.

6. A computer program product, according to claim 5, wherein said program causes a computer such that said distributed transaction manager individually provides the commands for database updating to the local transaction managers, in the case when said distributed transaction manager receives data for a service request from a client terminal via a network.

* * * * *

UNITED STATES PATENT AND TRADEMARK OFFICE
CERTIFICATE OF CORRECTION

PATENT NO.    : 6,374,243 B1
DATED         : April 16, 2002
INVENTOR(S)   : Kobayashi et al.

It is certified that error appears in the above-identified patent and that said Letters Patent is hereby corrected as shown below:

<u>Title page,</u>
Item [73], the name of the Assignee should be changed from "NTT Communicationware Corporation" to -- NTT Comware Corporation --.

Signed and Sealed this

Fifteenth Day of April, 2003

JAMES E. ROGAN
*Director of the United States Patent and Trademark Office*